Dec. 23, 1958  H. E. LEMONT, JR  2,865,688
ROLLER BEARING
Filed April 26, 1956
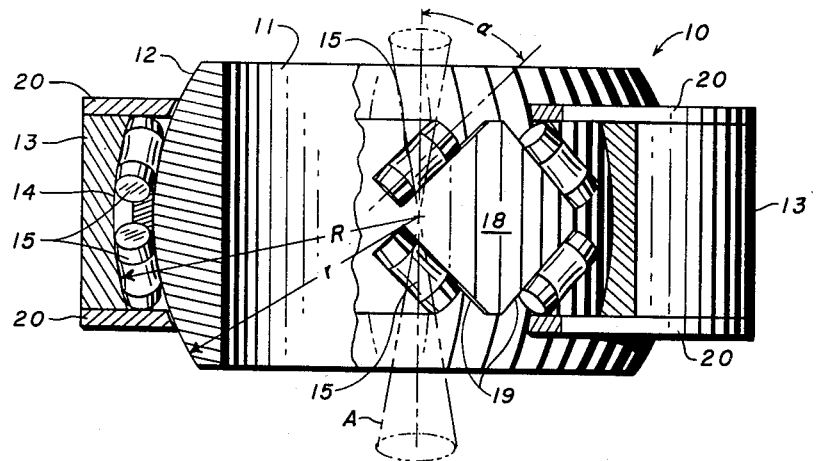
*Fig. 1*
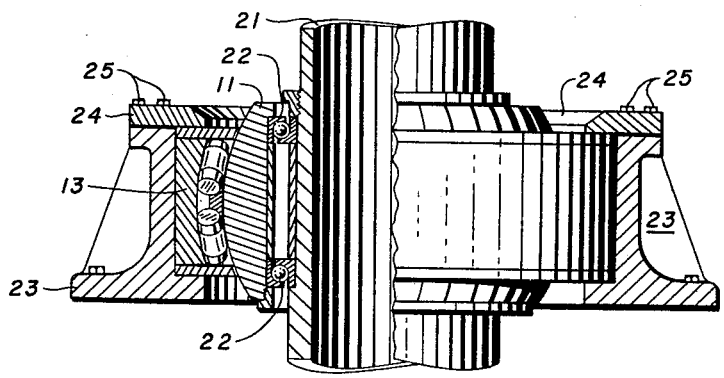
*Fig. 3*
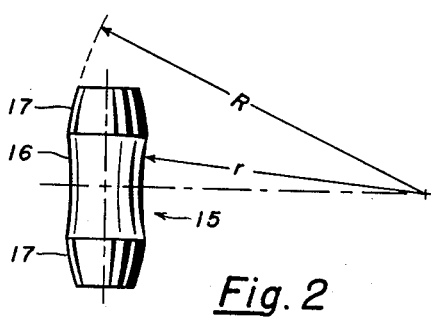
*Fig. 2*
HAROLD E. LEMONT, Jr.
INVENTOR.
BY 
ATTORNEY

United States Patent Office 2,865,688
Patented Dec. 23, 1958

2,865,688

ROLLER BEARING

Harold E. Lemont, Jr., Pottstown, Pa., assignor to Vertol Aircraft Corporation, Morton, Pa., a corporation of Pennsylvania Application April 26, 1956, Serial No. 580,958

8 Claims. (Cl. 308—194)

This invention relates to bearings and more particularly to roller bearings of the self aligning type and to the shape and arrangement of the rollers thereof to reduce friction during misalignment motion.

Presently available self aligning type bearings may be used for supporting shafts adapted for oscillating misalignment motion. However, the use of self aligning ball bearings in such applications is subject to the disadvantage that such bearings do not have a high shock or thrust load capacity. Self aligning roller bearings, although possessing better shock and thrust load characteristics, are subject to the disadvantage that in such applications the rollers have a position of operation where there exists pure sliding of the inner and/or outer races over the surfaces of the rollers which results in high frictional forces.

Accordingly, it is an object of the present invention to overcome the disadvantages of the presently available bearings and to provide a self aligning type bearing with rollers capable of withstanding high thrust loads and arranged such that lesser frictional forces occur during misalignment motion.

It is a further object of the present invention to position and arrange the rollers such that misalignment of the inner and outer races results in a combination of rolling and sliding of the rollers upon the bearing surfaces to thereby reduce frictional loads and to prolong the life of the bearing.

It is a further object to provide an improved roller bearing for applications requiring misalignment oscillations of the inner and outer races wherein the rollers are of the barrel or hourglass type having a concave central portion to conform to the contour of the convex bearing surface of the inner race and having convex end portions to conform to the contour of the concave bearing surface of the outer race.

Other objects and advantages will become apparent from the following description when read in conjunction with the accompanying drawings in which:

Fig. 1 is a partial cross sectional view of a preferred embodiment of the invention;

Fig. 2 is a detail view to an enlarged scale of one of the rollers; and

Fig. 3 is a view partly in section showing an application of the bearing to the support of a rotatable shaft.

Referring to Figs. 1 and 2 of the drawings, the bearing 10 consists of an inner bearing member 11 having a spherical outer surface 12 of radius $r$, an outer bearing member 13 having a spherical inner surface 14 of radius R, and a plurality of rollers 15 coacting between the inner and outer bearing members. Each of the rollers 15 have an intermediate concave surface portion 16 of radius equal to or slightly greater than radius $r$, which concave surface bears upon the surface 12 of the inner bearing member. The rollers are also provided with convex surface end portions 17 of radius equal to or slightly less than radius R, which end portions bear upon the surface 14 of the outer bearing member. The rollers 15 are retained in place by means of a cage 18 provided with openings 19 in which the rollers 15 are received. Although the embodiment shown includes two rows of rollers, it is to be noted that any number of rows of rollers may be used depending upon the thrust load requirements of the bearing, while the rollers may be arranged as shown or arranged such that their axes are tilted in the same direction. Seals or retainers 20 attached to the outer bearing member 13 complete the assembly.

As shown in Fig. 1, each roller 15 is positioned such that the axis thereof is tilted or displaced at an angle $a$ with respect to a plane cutting through the roller and containing the center line of the outer bearing member whereby misalignment motion of the inner bearing member with respect to the outer bearing member, as indicated by the dotted center line A of Fig. 1, results in a combined rolling and sliding of all of the rollers upon the surfaces 12 and 14. In this connection, it should be noted that if the rollers were positioned such that the axes thereof were aligned with or contained within planes radial to the axis of the outer bearing member, as is the practice in self aligning roller bearings, any misalignment motion of the inner bearing member would result in rolling of some of the rollers, sliding of other rollers and a combination of rolling and sliding of the remaining rollers, the combined effect of which is a greater frictional load than when all rollers have a combined rolling and sliding motion. Although the angle $a$ is shown in the drawings to be approximately 45°, it is to be understood that this invention is not limited to such angle as other angles will produce frictional loads of magnitude less than that obtained by the use of presently available bearings.

Referring now to Fig. 3, there is shown an application of the bearing 10 to the support of a rotating shaft 21, the axis of which shaft may be inclined in any direction. In this arrangement, the shaft 21 is rotatably mounted by means of bearings 22 to the inner bearing member 11, while the outer bearing member 13 is attached to fixed structure 23 by means of a ring 24 and associated bolts 25 threadedly engaging the fixed structure. Alternatively, the shaft 21 may be fixedly attached to the inner bearing member 11 and the outer bearing member 13 supported by means of bearings carried by the fixed structure 23 whereby the bearing 10 of the present invention would rotate as a unit with the shaft 21.

Although shown and described in what is believed to be the most practical and preferred embodiment, it is apparent that departures therefrom will suggest themselves to those skilled in the art and may be made without departing from the spirit and scope of the invention. I therefore do not wish to restrict myself to the particular form of construction illustrated and described, but desire to avail myself of all modifications that may fall within the scope of the appended claims.

Having thus described my invention, what I claim is:

1. A bearing comprising an inner member having a spherical outer surface, an outer member having a spherical inner surface uniformly spaced from said outer surface, rollers disposed between said surfaces, said rollers having a portion bearing upon said outer surface and having another portion bearing upon said inner surface, and means for retaining said rollers in a position such that the axis of each roller forms an angle with a plane cutting through the roller and containing the axis of said outer member.

2. A bearing comprising an inner member having a spherical outer surface, an outer member having a spherical inner surface, rollers positioned between said surfaces, said rollers having an intermediate portion bearing upon said surface of said inner member and having end portions bearing upon said surface of said outer member, and means for retaining said rollers in a position such that the axis of each roller forms an angle with a plane cutting through the roller and containing the axis of said outer member.

3. A bearing comprising an inner member having a spherical outer surface, an outer member having a spherical inner surface, rollers positioned between said surfaces, said rollers having an intermediate concave surface portion bearing upon said surface of said inner member and having convex surface end portions bearing upon said surface of said outer member, and means for retaining said rollers in a position such that the axis of each roller forms an angle with a plane cutting through the roller and containing the axis of said outer member.

4. A bearing comprising an inner member having a spherical outer surface, an outer member having a spherical inner surface uniformly spaced from said outer surface, rollers disposed between said surfaces, said rollers having a portion bearing upon said outer surface and having another portion bearing upon said inner surface, and a cage for retaining each of said rollers in a position such that the axes of adjacent rollers intersect each other and the axis of each of said rollers is on a line forming an acute angle with a plane cutting through the roller and containing the axis of said outer member.

5. A bearing comprising an inner member having a spherical outer surface, an outer member having a spherical inner surface, at least one row of rollers positioned between said surfaces, said rollers having an intermediate portion bearing upon said surface of said inner member and having end portions bearing upon said surface of said outer member, and means for retaining said rollers at an angle relative to planes radial to the axis of said outer member and such that the axes of adjacent rollers intersect each other.

6. A bearing comprising an inner member having a spherical outer surface, an outer member having a spherical inner surface, a plurality of rows of rollers positioned between said surfaces, said rollers having an intermediate portion bearing upon said surface of said inner member and having end portions bearing upon said surface of said outer member, and means for retaining said rollers at an angle relative to planes radial to the axis of said outer member and such that the axes of adjacent rollers of each of said rows intersect each other.

7. A bearing comprising an inner member having a spherical outer surface, an outer member having a spherical inner surface, a plurality of rows of rollers positioned between said surfaces, said rollers having an intermediate portion bearing upon said surface of said inner member and having end portions bearing upon said surface of said outer member, and means for retaining said rollers at an angle relative to planes radial to the axis of said outer member and such that the axes of rollers of adjacent rows intersect each other.

8. A bearing comprising an inner member having a spherical outer surface, an outer member having a spherical inner surface, a plurality of rows of rollers positioned between said surfaces, said rollers having an intermediate portion bearing upon said surface of said inner member and having end portions bearing upon said surface of said outer member, and means for retaining said rollers at an angle relative to planes radial to the axis of said outer member and such that the axes of adjacent rollers of each of said rows intersect each other and the axes of rollers of adjacent rows intersect each other.

References Cited in the file of this patent

UNITED STATES PATENTS

| 2,140,435 | Stieber | Dec. 13, 1938 |

FOREIGN PATENTS

| 62,286 | Sweden | Sept. 24, 1923 |
| 350,349 | Great Britain | June 11, 1931 |